United States Patent

Owsley et al.

[15] 3,701,342
[45] Oct. 31, 1972

[54] VALVE MEMBER

[72] Inventors: Herbert B. Owsley; Stuart E. Bunn, both of P.O. Box 388, Shawnee Mission, Kans. 66201

[22] Filed: March 8, 1971

[21] Appl. No.: 121,933

[52] U.S. Cl. ......123/41.16, 123/188 A, 123/188 AA
[51] Int. Cl. ................................................F01l 3/14
[58] Field of Search..123/41.16, 41.31, 41.34, 41.41, 123/188 A, 188 AA, 188 GC

[56] References Cited

UNITED STATES PATENTS

| | | | |
|---|---|---|---|
| 2,369,063 | 2/1945 | McDill | 123/41.16 |
| 2,611,348 | 9/1952 | Lindsay | 123/41.16 |
| 2,548,092 | 4/1951 | Bartlett et al. | 123/188 A |
| 1,823,452 | 9/1931 | Heron | 123/188 A |
| 2,440,461 | 4/1948 | Clements | 123/41.16 |
| 3,233,599 | 2/1966 | Schober | 123/41.16 |

*Primary Examiner*—Al Lawrence Smith
*Attorney*—Fishburn, Gold & Litman

[57] ABSTRACT

A valve member operative for use in an internal combustion engine and which incorporates evaporation-condensation heat transfer structure. The valve member has a head and a stem extending therefrom and a hermetically sealed cavity therein lined with a capillary flow medium and containing a volatile and condensible working fluid which establishes heat-transfer flow paths within the valve member by repeated evaporation and condensation of the working fluid.

7 Claims, 3 Drawing Figures

INVENTOR.
Herbert B. Owsley and
Stuart E. Bunn

BY Fishburn, Gold & Litman

ATTORNEYS

VALVE MEMBER

The present invention relates to valve structures and more particularly to valves for internal combustion engines and the like.

The principal objects of the present invention are: to provide a valve member operative for use in an internal combustion engine and which incorporates evaporation-condensation heat transfer structure to transfer heat from a head to a stem upon application of heat adjacent the head thereof; to provide such a valve member having a head and a stem extending therefrom and a hermetically sealed cavity therein lined with a capillary flow medium and containing a volatile and condensible working fluid which establishes heat transfer flow paths within the valve member by repeated evaporation and condensation of working fluid therein; to provide such a valve member having a reservoir of noncondensible fluid positioned in a condenser section of the cavity to effect a temperature-stabilizing fluid-vapor interface for fluid evaporated in an evaporation section of the cavity in response to application of heat thereon; to provide such a valve member operative to remove heat from a head thereof and transfer heat to a stem portion and to dissipate heat from the stem; to provide such a valve member operative to effect a substantially equal temperature in a valve head and a valve seat receiving same to prolong the life thereof; to provide such a valve member operative to cool the head thereof by heat transfer to a stem portion thereof to thereby substantially reduce heat corrosion particularly on a face and head portion thereof; and to provide such a valve member which is positive in operation, completely self-contained, efficient in the transfer of heat from the head to the stem portion thereof, and which is particularly well adapted for the proposed use.

Other objects and advantages of this invention will become apparent from the following description taken in connection with the accompanying drawings wherein are set forth by way of illustration and example certain embodiments of this invention.

The drawings constitute a part of this specification and include an exemplary embodiment illustrating various objects and features of the valve member which incorporates evaporation-condensation heat transfer structure.

Figure 1:
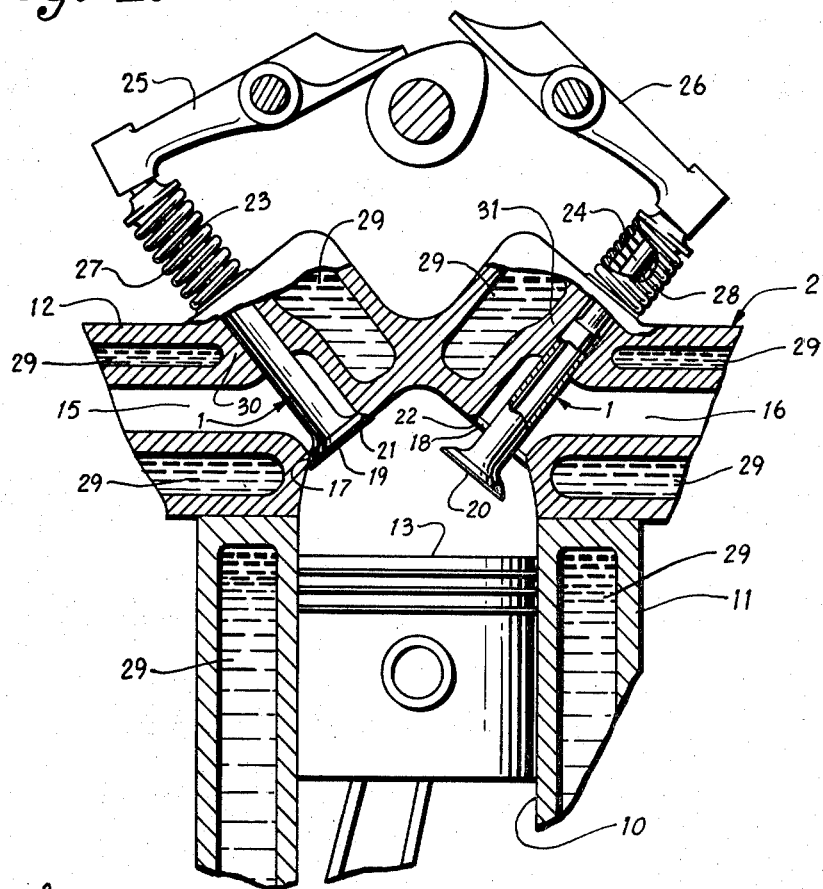
FIG. 1 is a fragmentary sectional view of a cylinder in an internal combustion engine having intake and exhaust valves embodying the features of the present invention.
Figure 2:
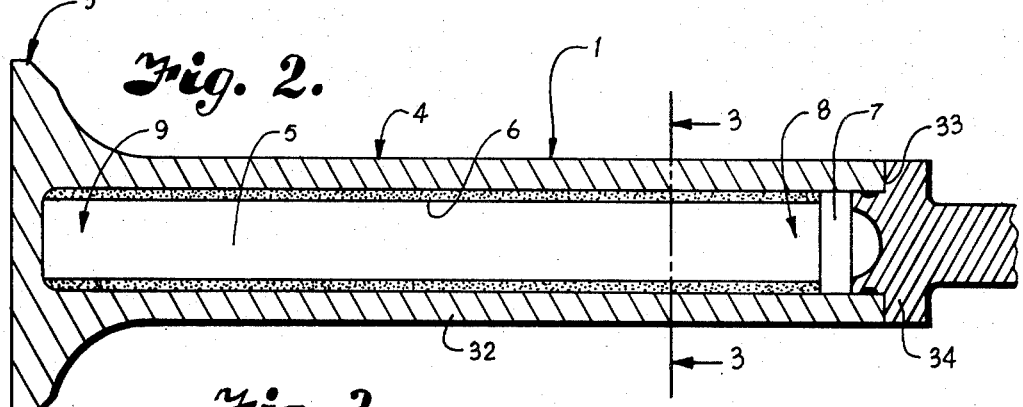
FIG. 2 is an enlarged longitudinal sectional view of one of said valves.
Figure 3:
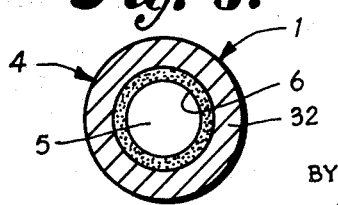
FIG. 3 is an enlarged transverse sectional view taken on line 3—3, FIG. 2.

Referring more in detail to the drawings:

As required, detailed embodiments of the invention are disclosed herein, however, it is to be understood that the disclosed embodiments are merely exemplary of the invention which may be embodied in various forms that are different from those illustrative embodiments presented herein, therefore, specific structural and functional details disclosed herein are not to be interpreted as limiting but merely as a basis for the claims actually defining the scope of this invention. In this regard, it is to be recognized that valve members which incorporate heat transfer flow paths therein, in accordance herewith, may be embodied in various forms and furthermore that such valve members may be variously shaped and positioned in an internal combustion engine. However, the disclosure hereof is presented only as a representative basis for teaching one skilled in the art to variously employ the present invention in virtually any appropriate detailed structure.

In the disclosed embodiment, the reference numeral 1 generally designates valve member operative for use in an internal combustion engine 2 and includes a head portion 3 and a stem portion 4 extending therefrom and having a hermetically sealed cavity or vacuum chamber 5 therein which is lined with a capillary flow medium or material 6 to form a capillary structure saturated with a volatile and condensible working fluid and a reservoir 7 of noncondensible fluid positioned in a condenser section 8 of the cavity or vacuum chamber 5 to provide a temperature-stabilizing fluid-vapor interface for fluid evaporated in an evaporation section 9 of the cavity or vacuum chamber 5 in response to application of heat thereon, as for example, ignition of a suitable fuel or fuel mixture within each cylinder 10 of the internal combustion engine 2 to thereby establish an evaporation-condensation heat transfer structure.

The internal combustion engine 2 having the valve member 1 therein may be of any suitable structure employing intake and exhaust valves, such as having a plurality of cylinders 10 each having a cylinder block 11 and a head 12 thereby defining a space for reciprocation of a suitable piston 13 therein in response to ignition of a suitable fuel or fuel mixture within a space between a face of the piston 13 and the head 12, as by suitable ignition means, such as a spark plug (not shown).

Cylinders 10 of internal combustion engines preferably have a pair of fluid flow passages 15 and 16, intake and exhaust respectively, with the fluid flow passages 15 and 16 each being in fluid communication with the interior of the respective cylinder 10 through separate apertures or openings 17 and 18 respectively. The apertures or openings 17 and 18 are respectively and alternately opened and closed by intake and exhaust valves 19 and 20 respectively. The head portion 3 of the intake and exhaust valves 19 and 20 is in engagement with valve seats 21 and 22 respectively except when fluids are flowing through the passages 17 and 18.

The stem portion 4 of the intake and exhaust valves 19 and 20 have extensions 23 and 24 respectively which each extend through the respective head 12 of the internal combustion engine 2 and into a position to be contacted by suitable means for moving the valves 19 and 20 to open and close the apertures or openings 17 and 18 respectively, such as valve lifters 25 and 26 respectively which are operative to alternately open the respective valves 19 and 20 against the resistance of suitable resilient members, such as springs 27 and 28 respectively which are operative to maintain the respective valves 19 and 20 in a closed or seated position until engaged by the respective valve lifters 25 and 26.

The valve members 1 of the present invention are each operative to transfer heat from the head portion 3 to the stem portion 4 and to dissipate heat from the stem portion. Internal combustion engines preferably have means for receiving heat from valve stems and conveying the heat away from a combustion area, such as a water jacket 29 surrounding the cylinders 10, and in the illustrated engine, walls 30 and 31 define guides for movement of the valves 19 and 20 respectively through the water jacket 29 which is operative to cool the engine and the walls 30 and 31 by moving the water through a suitable radiator (not shown).

In the illustrative embodiment of the valve members 1, the head portion 3 is positioned at one end thereof with wall portions 32 defining the stem portion 4 and extending from the enlarged head portion 3 and terminating at an open end 33 thereby defining the cavity 5 which extends between the open end 33 and a closed end at or within the enlarged head portion 3. A closure and seal member 34 is secured in the open end 33 to hermetically seal the cavity 5 and retain the working fluid therein.

The head and stem portions 3 and 4 and the closure and seal member 34 may be any suitable material which will be stable at expected operating temperatures, such as metals including steel, stainless steel, and suitable steel alloys, such as those including nickel, copper, and the like.

The capillary flow medium 6 is disposed contiguous and in engagement with the interior surfaces of the wall portions 32 defining the cavity or vacuum chamber 5 and the capillary flow medium 6 extends between the head portion 3 and the reservoir 7 and may be any suitable material, such as cloth, glass fiber, wire screen, porous ceramic and the like. The capillary flow medium 6 is saturated with a suitable volatile and condensible working fluid which is sufficiently volatile to vaporize that portion of the working fluid within the evaporation section 9 when the valve 1 is heated adjacent the enlarged head portion 3, as by ignition of fuel in the cylinders 10 to establish an evaporation-condensation pattern in the working fluid and capillary flow medium 6, as later described. Mercury, bismuth, and glycerine have been found to be suitable working fluids to accommodate various temperature ranges.

The reservoir 7 is positioned in the cavity or vacuum chamber 5 and is disposed adjacent the closure and seal member 32 and contains a noncondensible fluid providing a temperature-stabilizing fluid-vapor interface thereby defining the condenser section 8. The vaporized fluid flows from the evaporation section 9 adjacent the enlarged head portion 3 to the condenser section 8 and returns to the evaporation section 9 through the capillary flow medium 6 where the fluid is again vaporized thereby establishing an evaporation-condensation flow pattern.

In operation of valve members constructed as illustrated and described, heat is applied to one end of the valve 1 adjacent the enlarged head portion 3 thereof, as by ignition of fuel in respective cylinders, to vaporize the volatile and condensible working fluid in the evaporation section 9 thereby causing same to flow or travel through the cavity 5 toward the condenser section 8 where heat is transferred to the walls 30 and 31 of the water jacket 29 and the working fluid engages the reservoir 7 of noncondensible fluid thereby cooling and condensing the working fluid and providing a temperature-stabilizing fluid-vapor interface which allows the condensed working fluid to return to the evaporation section 9 through the capillary flow medium 6 whereby heat again vaporizes the working fluid in the evaporation section 9 for flow to the condenser section 8 thereby establishing an evaporation-condensation flow pattern and heat transfer in the working fluid and capillary flow medium 6. The heat applied adjacent the enlarged head portion 3 is thereby conveyed to the condenser section 8 in the stem portion 4 whereby the heat is transferred from the head portion 3 to the stem portion 4 and then to the water jacket 29 through the guide walls 30 and 31 by conduction.

The valve lifters 25 and 26 engage the extensions 23 and 24 of the intake and exhaust valves 19 and 20 respectively and are operative in cooperation with the springs 27 and 28 to alternately move the valves 19 and 20 to open and close the apertures or openings 17 and 18. The stem portion 4 of the valves 19 and 20 remains in engagement with the walls 30 and 31 during their respective movements to permit continuous dissipation of heat from the respective stem portions to the portions of the water jacket 29 engaged thereby.

The head portion 3 of the valve 1 is thereby rapidly cooled by the evaporation-condensation flow pattern within the vacuum chamber or cavity 5 and the temperature differential between the head portion 3 and the stem portion 4 of the valve 1 is substantially reduced.

It is to be understood that while we have illustrated and described one form of our invention, it is not to be limited to the specific form or arrangement of parts herein described and shown.

What we claim and desire to secure by Letters Patent is:

1. In an internal combustion engine having a combustion chamber with intake and exhaust passages and valve seats at the combustion chamber ends of said passages and valve guide means, a valve member comprising:
   a. valve means having a head with a seat engaging portion to close the respective passage and a stem extending from said head, said valve means being reciprocably mounted in the valve guide means;
   b. an internally sealed cavity within said stem and extending from the head and contiguous to external surfaces of said stem;
   c. capillary means disposed contiguous the walls of said cavity;
   d. means cooperating with the valve guide means for receiving heat from and cooling the valve stem remote from the valve head; and
   e. a charge of working fluid within said cavity to establish an evaporation-condensation pattern to remove heat from said valve stem and transfer same to the stem end portion.

2. In an internal combustion engine having a combustion chamber with intake and exhaust passages and valve seats at the combustion chamber ends of said passages and valve guide means, a valve member comprising:
   a. an elongated valve body having an enlarged head with a seat engaging portion to close the respective passage and a stem portion extending therefrom, said valve body being reciprocably mounted in the valve guide means and having a closed end adjacent said head and stem defining wall portions extending therefrom and defining a cavity having an open end;

b. means engaging said valve body adjacent the open end thereof to hermetically seal the cavity;

c. means within said hermetically sealed cavity to establish an evaporation-condensation flow pattern therein for heat transfer from said head portion to said stem portion, said means establishing the evaporation condensation flow pattern including a capillary flow medium disposed contiguous the wall portions defining the cavity and extending between said head of said valve body and adjacent said cavity sealing means and a charge of working fluid in said cavity; and d. means cooperating with the valve guide means for receiving heat from and cooling the valve stem to thereby cool said head of said valve body.

3. In an internal combustion engine having a combustion chamber with intake and exhaust passages and valve seats at the combustion chamber ends of said passages and valve guide means, a valve member comprising:

a. an elongated valve body having an enlarged head with a seat engaging portion to close the respective passage and a stem portion extending therefrom, said valve body being reciprocably mounted in the valve guide means and having a closed end adjacent said head and stem defining wall portions extending therefrom and defining a cavity having an open end;

b. a reservoir in said cavity and disposed adjacent said cavity sealing means and containing a non-condensible fluid providing a temperature stabilizing fluid vapor interface;

c. means engaging said valve body adjacent the open end thereof to hermetically seal the cavity;

d. means within said hermetically sealed cavity to establish an evaporation-condensation flow pattern therein for heat transfer from said head portion to said stem portion; and e. means cooperating with the valve guide means for receiving heat from and cooling the valve stem to thereby cool said head of said valve body.

4. In an internal combustion engine having a combustion chamber with intake and exhaust passages and valve seats at the combustion chamber ends of said passages and valve guide means, a valve member comprising:

a. an elongated valve body having an enlarged head with a seat engaging portion to close the respective passage and a stem portion extending therefrom, said valve body being reciprocably mounted in the valve guide means and having a closed end adjacent said head and stem defining wall portions extending therefrom and defining a cavity having an open end;

b. means engaging said valve body adjacent the open end thereof to hermetically seal the cavity;

c. means within said hermetically sealed cavity to establish an evaporation-condensation flow pattern therein for heat transfer from said head portion to said stem portion, said means establishing the evaporation - condensation flow pattern including:

1. a reservoir in said cavity and disposed adjacent said cavity sealing means and containing a non-condensible fluid providing a temperature-stabilizing fluid-vapor interface;

2. a capillary flow medium disposed contiguous the wall portions defining the cavity and extending between said head of said valve body and said reservoir;

3. a charge of volatile and condensible working fluid in said cavity; and 4. means cooperating with the valve guide means for receiving heat from and cooling the valve stem to thereby cool said head of said valve body.

5. In an internal combustion engine having a combustion chamber with intake and exhaust passages and valve seats at the combustion chamber ends of said passages and valve guide means, a valve member comprising:

a. an elongated valve body having an enlarged head with a seat engaging portion to close the respective passage and a stem portion extending therefrom, said valve body being reciprocably mounted in the valve guide means and having a closed end adjacent said head and stem defining wall portions extending therefrom and defining a cavity having an open end;

b. means engaging said valve body adjacent the open end thereof to hermetically seal the cavity;

c. means within said hermetically sealed cavity to establish an evaporation-condensation flow pattern therein for heat transfer from said head portion to said stem portion, said means establishing the evaporation condensation flow pattern including:

1. a fluid evaporation section within said cavity and disposed adjacent the closed end of said valve body;

2. a fluid condenser section within said cavity and disposed adjacent said cavity sealing means;

3. a reservoir containing a non-condensible fluid and disposed in said fluid condenser section to provide a temperature-stabilizing fluid-vapor interface;

4. a capillary flow medium disposed contiguous the wall portions defining the cavity and extending between said fluid evaporation section and said fluid condenser section;

5. a charge of volatile and condensible working fluid in said hermetically sealed cavity; and d. means cooperating with the valve guide means for receiving heat from and cooling the valve stem to thereby cool said head of said valve body.

6. A valve member for use in internal combustion engines having a combustion chamber with intake and exhaust passages communicating with the combustion chamber and having valve seats at the combustion chamber ends of said passages and valve guide means, said valve member comprising:

a. an elongated valve body having an enlarged head with a seat engaging portion to close the respective passage and a stem portion extending therefrom, said valve body being reciprocably mounted in the valve guide means and having a closed end adjacent said head and stem defining wall portions extending therefrom and defining a cavity having an open end;

b. means engaging said valve body adjacent the open end thereof to hermetically seal the cavity;

c. means within said hermetically sealed cavity to establish an evaporation-condensation flow pattern therein for heat transfer from said head to said stem portion;
d. means cooperating with the valve guide means for receiving heat from and cooling the valve stem to thereby cool said head of said valve body;
e. means within said cavity and disposed adjacent said cavity sealing means to provide a temperature stabilizing fluid-vapor interface;
f. said means providing the temperature-stabilizing fluid-vapor interface comprises a reservoir containing a non-condensible fluid; and
g. said means establishing the evaporation-condensation flow pattern comprises a capillary flow medium disposed contiguous the wall portions defining the cavity and extending between said head of said valve body and said reservoir and a charge of volatile and condensible working fluid in said cavity.

7. A valve member for use in internal combustion engines having a combustion chamber with intake and exhaust passages communicating with the combustion chamber and having valve seats at the combustion chamber ends of said passages and valve guide means, said valve member comprising:
a. an elongated valve body having an enlarged head with a seat engaging portion to close the respective passage and a stem portion extending therefrom, said valve body being reciprocably mounted in the valve guide means and having a closed end adjacent said head and stem defining wall portions extending therefrom and defining a cavity having an open end;
b. means engaging said valve body adjacent the open end thereof to hermetically seal the cavity;
c. means within said hermetically sealed cavity to establish an evaporation-condensation flow pattern therein for heat transfer from said head to said stem portion;
d. means cooperating with the valve guide means for receiving heat from and cooling the valve stem to thereby cool said head of said valve body;
e. means within said cavity and disposed adjacent said cavity sealing means to provide a temperature-stabilizing fluid-vapor interface;
f. said means providing the temperature-stabilizing fluid-vapor interface comprises a reservoir containing a noncondensible fluid; and
g. said means establishing the evaporation-condensation flow pattern comprises a fluid evaporation section within said cavity and disposed adjacent the closed end of said valve body and a fluid condenser section within said cavity and disposed adjacent said cavity sealing means and a capillary flow medium disposed contiguous the wall portions defining the cavity and extending between said fluid evaporation section and said fluid condenser section and a charge of volatile and condensible working fluid in said hermetically sealed cavity.

* * * * *